(12) United States Patent
Hooda et al.

(10) Patent No.: US 10,798,195 B2
(45) Date of Patent: Oct. 6, 2020

(54) FAST ROAMING WITH SHARED SERVICES IN ENTERPRISE FABRIC BASED NETWORKS

(71) Applicant: Cisco Technology, Inc., San Jose, CA (US)

(72) Inventors: Sanjay K. Hooda, Pleasanton, CA (US); Prakash Jain, Fremont, CA (US); Marc P. Comeras, Mountain View, CA (US); Victor M. Moreno, Carlsbad, CA (US); Atri Indiresan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 353 days.

(21) Appl. No.: 15/834,341

(22) Filed: Dec. 7, 2017

(65) Prior Publication Data

US 2018/0367627 A1 Dec. 20, 2018

Related U.S. Application Data

(60) Provisional application No. 62/521,863, filed on Jun. 19, 2017.

(51) Int. Cl.
*H04L 29/08* (2006.01)
*H04L 29/12* (2006.01)

(52) U.S. Cl.
CPC ............ *H04L 67/26* (2013.01); *H04L 61/103* (2013.01); *H04L 61/1511* (2013.01); *H04L 61/6022* (2013.01); *H04L 61/2015* (2013.01)

(58) Field of Classification Search
None
See application file for complete search history.

(56) References Cited

U.S. PATENT DOCUMENTS

| 8,745,191 | B2 | 6/2014 | Raleigh et al. |
| 9,351,193 | B2 | 5/2016 | Raleigh et al. |
| 9,565,543 | B2 | 2/2017 | Raleigh |
| 2014/0098671 | A1* | 4/2014 | Raleigh ................. H04M 15/41 370/235 |
| 2016/0191717 | A1 | 6/2016 | Ramprasad et al. |

\* cited by examiner

*Primary Examiner* — Cai Y Chen
(74) *Attorney, Agent, or Firm* — Patterson + Sheridan, LLP

(57) ABSTRACT

The embodiments herein push notifications to network devices used by a shared service to which a roaming host in a network fabric is subscribed. For example, a network fabric controller can access a VN policy table which stores the relationships between the virtual networks in the network fabric. Using this table, the controller can identify what shared service VNs (i.e., extranets) can communicate with the host's VN. The controller can push out notifications to the network devices used by the shared service VNs to store the new location of the host. That is, the network devices that locally store a location of the host can update their routing caches to point to the new location of the host. In this manner, the network fabric can reduce the time needed to reconverge on the new location of the host by updating the network devices used by the shared service VNs.

17 Claims, 6 Drawing Sheets

HTDB 120

| KEY | ENDPOINT | VN |
|---|---|---|
| IP ADDRESS OF HOST 160A | SWITCH 140A | RED |
| IP ADDRESS OF HOST 160B | SWITCH 140A | GREEN |
| IP ADDRESS OF HOST 160C | SWITCH 140B | RED |
| IP ADDRESS OF HOST 160D | SWITCH 140B | GREEN |
| IP ADDRESS OF SHARED SERVICE 150A | SWITCH 140C | PURPLE |
| IP ADDRESS OF SHARED SERVICE 150B | SWITCH 140B | BLUE |

FIG. 3

FAST ROAMING WITH SHARED SERVICES IN ENTERPRISE FABRIC BASED NETWORKS

CROSS-REFERENCE TO RELATED APPLICATIONS

This application claims benefit to U.S. provisional application Ser. No. 62/521,863 filed on Jun. 19, 2017. The aforementioned related patent application is herein incorporated by reference in its entirety.

TECHNICAL FIELD

Embodiments presented in this disclosure generally relate to roaming clients in a network fabric, and more specifically, to pushing notifications to network device associated with different virtual networks in the network fabric.

BACKGROUND

A network fabric may be established for an enterprise—e.g., a university, hospital, business, and the like—which provides access between the devices (referred to as hosts) coupled to the network fabric as well as external networks (e.g., the Internet). The network fabric can include tunnels between different hosts that route data between endpoints (e.g., different switches and routers in the network fabric). In one embodiment, the hosts are assigned to different virtual networks (VNs) in the network fabric. For example, the client devices (e.g., laptops, cell phones, etc.) may be assigned to a first VN while Internet of Things (IoT) devices are assigned to a second VN. For security reasons, the hosts assigned to the first VN may not be able to communicate with the hosts in the second VN.

The network fabric can also include shared services such as Dynamic Host Configuration Protocol (DHCP) or Domain Name Servers (DNS) which are assigned to one or more VNs. These shared services may communicate with multiple VNs. For example, the hosts in both the first and second VNs may communicate with the shared services. However, as hosts roam between network devices in the network fabric (e.g., when a mobile client moves from a first switch to a second switch in the network fabric), the network fabric needs to converge on the new location of the roaming host. This process takes time which can delay traffic from reaching the host at its new location.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 illustrates a host tracking database, according to an embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
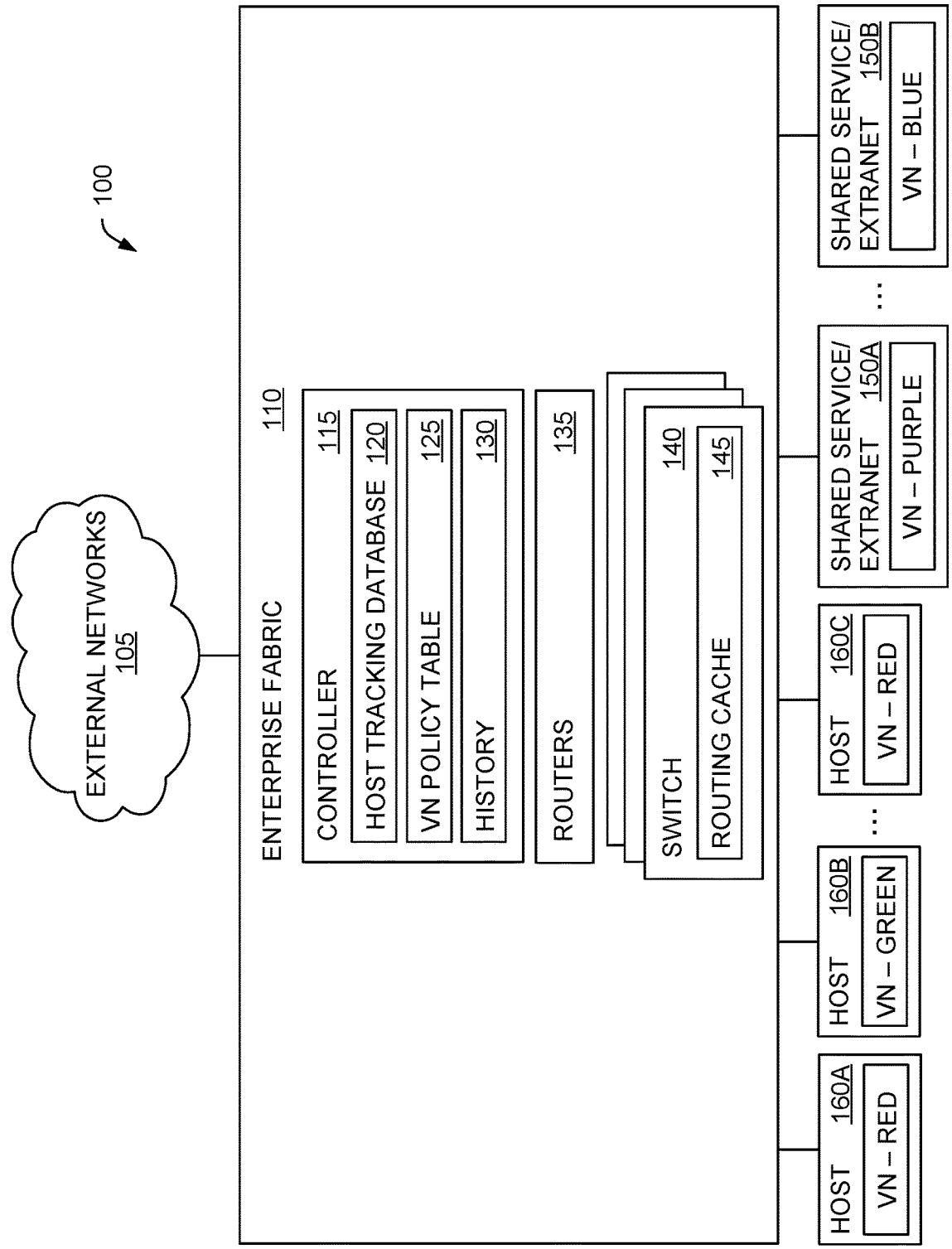
FIG. 1 illustrates a diagrammatic view of a computing network that includes an enterprise fabric according to an embodiment described herein.

One embodiment presented in this disclosure is a computing system that includes a process and a memory storing a program configured to, when executed by the processor, to perform an operation. The operation includes determining that a host has roamed to a new endpoint in a network fabric where the host is assigned to a first virtual network in the network fabric and determining, using a virtual network policy table, that the host is permitted to communicate with a shared service where the shared service is assigned to a second virtual network in the network fabric. The operation also includes pushing, in response to determining that the host has roamed, a notification to a first endpoint in the network fabric connected to the shared service where the notification instructs the first endpoint to update a local routing cache to point to the new endpoint for a location of the host.

Another embodiment presented in this disclosure is a method that includes determining that a host has roamed to a new endpoint in a network fabric where the host is assigned to a first virtual network in the network fabric and determining, using a virtual network policy table, that the host is permitted to communicate with a shared service where the shared service is assigned to a second virtual network in the network fabric. The method also includes pushing, in response to determining that the host has roamed, a notification to a first endpoint in the network fabric connected to the shared service where the notification instructs the first endpoint to update a local routing cache to point to the new endpoint for a location of the host.

Another embodiment presented in this disclosure is a network fabric that includes a new endpoint connected to a host where the host is assigned to a first virtual network in the network fabric and a first endpoint connected to a shared service where the shared service is assigned to a second virtual network in the network fabric. The network fabric also includes a controller configured to determine that the host has roamed to the new endpoint, determine, using a virtual network policy table, that the host is permitted to communicate with the shared service, and push, in response to determining that the host has roamed, a notification to the first endpoint where the notification instructs the first endpoint to update a local routing cache to point to the new endpoint for a location of the host.

EXAMPLE EMBODIMENTS

Hosts (e.g., client devices) can roam between network devices (e.g., edge devices) in a network fabric. In response, the network fabric updates a host tracking database (HTDB) to indicate the new location of the host. In one embodiment, the HTDB indicates the current network device the host uses to access the network fabric. However, other network devices on the same VN as the roaming host may maintain local routing caches which store the old location of the host, and as such, forward data to the previous network device rather than to the new network device to which the host is connected. Thus, when updating the HTDB, a controller can push out notifications to the network devices on the same VN that locally store a location of the host so that these network devices can update their local routing caches to point to the new location of the host. In so doing, the network fabric reduces the time needed to reconverge on the new location of the host.

In addition to pushing notifications to the network devices on the same VN as the host, the embodiments herein push notifications to network devices used by a shared service to which the roaming host is subscribed. For example, the network fabric controller can access a VN policy table which stores the relationships between the VNs in the network fabric. Using this table, the controller can identify what shared service VNs (i.e., extranets) can communicate with the host's VN. The controller can push out notifications to the network devices used by the shared service VNs to store the new location of the host. That is, the network devices that locally store a location of the host can update their routing caches to point to the new location of the host. In this manner, the network fabric can further reduce the time needed to reconverge on the new location of the host by updating the network devices used by the shared service VNs.

FIG. 1 illustrates a diagrammatic view of a computing network 100 that includes an enterprise fabric 110 according to an embodiment described herein. As shown, the enterprise fabric 110 (also referred to as a network fabric) provides connectivity between hosts 160 and external networks 105 (e.g., the Internet or other fabrics). Moreover, the enterprise fabric 110 permits the host 160 to communicate with each other as well as shared services 150 (or extranets). In one embodiment, the enterprise fabric 110 is distributed in a building or a campus such as a business, a hospital, university, etc. The enterprise fabric 110 can serve as a private network such as an intranet.

The enterprise fabric 110 includes a controller 115 which can include hardware, software, or combinations thereof that maintain and control the network devices in the enterprise fabric 110—i.e., routers 135 and switches 140. In one embodiment, the controller 115 transmits control plane traffic to the routers 135 and switches 140 in order to configure these devices. Although not shown, the controller 115 may be a software application stored in memory and executed by a computer processor. In another embodiment, the controller 115 may be hardware circuitry or firmware disposed on an integrated circuit. In one embodiment, the controller 115 is disposed in one of the routers 135 or the switches 140 in the fabric 110. In another embodiment, the controller 115 is disposed in a separate computing system.

The controller 115 includes a HTDB 120, a VN policy table 125, and a history 130. In one embodiment, the HTDB 120 maps the hosts 160 to a specific VN supported by the enterprise fabric 110. That is, although the host 160 may connect and use the same routers 135 and switches 140 in the fabric 110, the data plane may be divided into different VNs. For example, the hosts 160A and 160C are in the Red VN while the host 160B is in the Green VN. In one embodiment, the hosts 160 in different VNs are not permitted to communicate with each other. However, the hosts 160 in different VNs may be permitted to communicate with the shared services 150. That is, the hosts 160 in the Red and Green VNs can communicate with the Purple VN which includes the shared service 150A (e.g., a DHCP or DNS server).

The controller 115 can control the flow of data between the different VNs using the HTDB 120. For example, if the host 160A attempts to communicate with the host 160B which is in a different VN, the HTDB can deny the routing information necessary to the routers 135 and switches 140 that would enable hosts 160 on different VNs to communicate. In this manner, the data plane in the enterprise fabric 110 can be sub-divided into different VNs into which the hosts 160 and shared services 150 are assigned.

The VN policy table 125 indicates the relationships between the VNs. For example, the policy table 125 may indicate what other VN or VNs each VN in the enterprise fabric 110 can communicate with. For example, the VN policy table 125 may indicate that the Red and Green VNs can both communicate with the Purple VN (or vice versa) but that only the Red VN can communicate with the Blue VN (i.e., the hosts 160 in the Green VN cannot communicate with the shared service 150B in the Blue VN). Of course, in another example, the Red and Green VNs can communicate with both shared service VNs—i.e., the Purple and Blue VNs.

The history 130 permits the controller 115 to track which switch 140 or router 135 in the enterprise fabric 110 has requested routing information for each host 160 from the HTDB 120. Once provided by the HTDB 120, the switches 140 (and also the routers 135 if applicable) store the routing information in a routing cache 145 so that the next time the switch 140 receives data packets to forward to the host 160, the switch 140 can use the local routing cache 145 (rather than again querying the HTDB 120) for determining the location of the host 160 in the enterprise fabric 110. However, as mentioned above, the routing cache 145 can become stale as the hosts 160 roam in the enterprise fabric 110—e.g., as the hosts 160 connect to different switches 140 over time. For example, after a host 160 roams, a switch 140 may use its routing cache 145 to send data destined for that host 160 to the old switch 140 used to connect the host 160 to the fabric 110 instead of the new switch 140.

Figure 2:
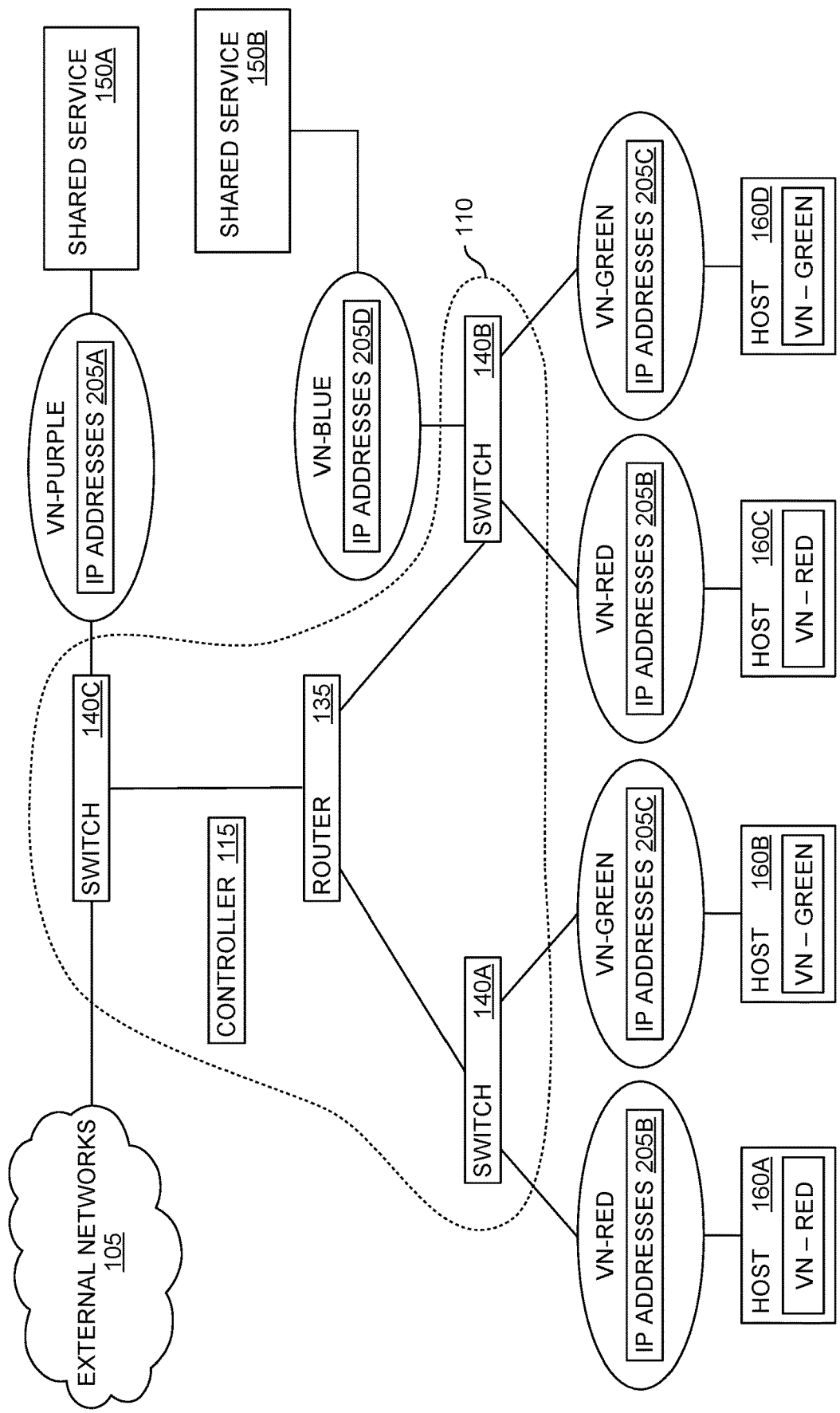
FIG. 2 illustrates a first state of the enterprise fabric according to an embodiment described herein.

FIG. 2 illustrates a first state of the enterprise fabric 110 according to an embodiment described herein. As shown, the network fabric 110 includes switches 140A-140C which are interconnected using a router 135. However, the network fabric 110 can have any number of switches 140 and routers 135. The switches 140A and 140B serve as edge devices (e.g., edge switches) which connect the hosts 160 and the shared service 150B to the enterprise fabric 110. The switch 140C is a boundary device which connects the enterprise fabric 110 to one or more external networks 105. Moreover, the switch 140C is connected to the shared service 150A.

Like in FIG. 1, the shared services 150 and the hosts 160 are assigned to respective VNs. Each of the VNs have respective IP addresses 205 which correspond to the hosts 160 or shared services 150 that are assigned to the VN. For example, the host 160A and 160C are both assigned IP address that are within the IP addresses 205B for the Red VN. In one embodiment, the IP addresses 205 for each of the VNs are not overlapping. Thus, the controller 115 can determine which VN a host or shared service is assigned to by evaluating its IP address.

Moreover, hosts or shared services assigned to different VNs can be associated with the same edge device. For example, the host 160C, the host 160D, and the shared service 150B are all in different VNs but use the same switch (i.e., switch 140B) to access the enterprise fabric 110.

In one embodiment, the enterprise fabric 110 establishes tunnels in order for the host 160 and the shared services 150 to communicate. For example, the host 160C may send a packet destined for the host 160A which is received at the switch 140B. Assuming the switch 140B has never transmitted data to the host 160A, the switch 140B does not know how to reach the host 160A—i.e., a tunnel has not yet been established between the host 160C and the host 160A. Put differently, the routing cache in the switch 140B does not include a path for reaching the host 160A through the enterprise fabric 110. In one embodiment, the switch 140B may use an IP address of the destination (i.e., the IP address of the host 160A) in order to index into its routing cache to determine if the switch 140B can reach the host 160A. Since a tunnel has not been established, the switch 140B forwards a request to the controller 115 to identify a network endpoint (also referred to as a tunnel endpoint) associated with the host 160A. Using the HTDB (not shown in FIG. 2), the controller 115 can identify the network endpoint for the host 160A—i.e., the edge device to which the host 160A is connected. Thus, as used herein, the endpoints are not hosts or client devices.

FIG. 3 illustrates the HTDB 120, according to an embodiment described herein. In this embodiment, the HTDB 120 includes a key column which lists the IP addresses for the host 160 and shared services 150 connected to the enterprise fabric. Upon receiving the request from the switch 140B to identify the network endpoint for the host 160A, the controller 115 can index into the HTDB 120 using the IP address for the host 160A and determine that the network endpoint for the host 160A is the switch 140A. In addition, the controller 115 can ensure using the HTDB 120 that the host attempting to communicate with the host 160A is in the same VN. Since both the host 160C and the host 160A are in the Red VN, the controller 115 forwards the network endpoint information to the switch 140B which can then establish a tunnel to the switch 140A so that data provided by the host 160C can reach the host 160A. Moreover, the switch 140B updates its routing cache so that future requests from the host 160C can reach the host 160A without the switch 140B sending a request for information to the controller 115 and the HTDB 120. In this manner, the HTDB 120 can enable the switches 140 in the enterprise fabric 110 to permit the hosts 160 in the same VN to establish tunnels between the various network endpoints.

A similar process can be used to establish tunnels between the shared services 150 and the hosts 160. That is, the controller 115 can use the HTDB 120 to identify which network endpoint each host 160 or shared service 150 is associated with so that tunnels can be established. Moreover, the controller 115 may also reference the VN policy table (not shown in FIGS. 2 and 3) to ensure that cross-VN communication is permitted. For example, the hosts 160 in the Red and Green VNs may be permitted to communicate with the shared services 150 in the Purple VN but not with each other.

Figure 4:
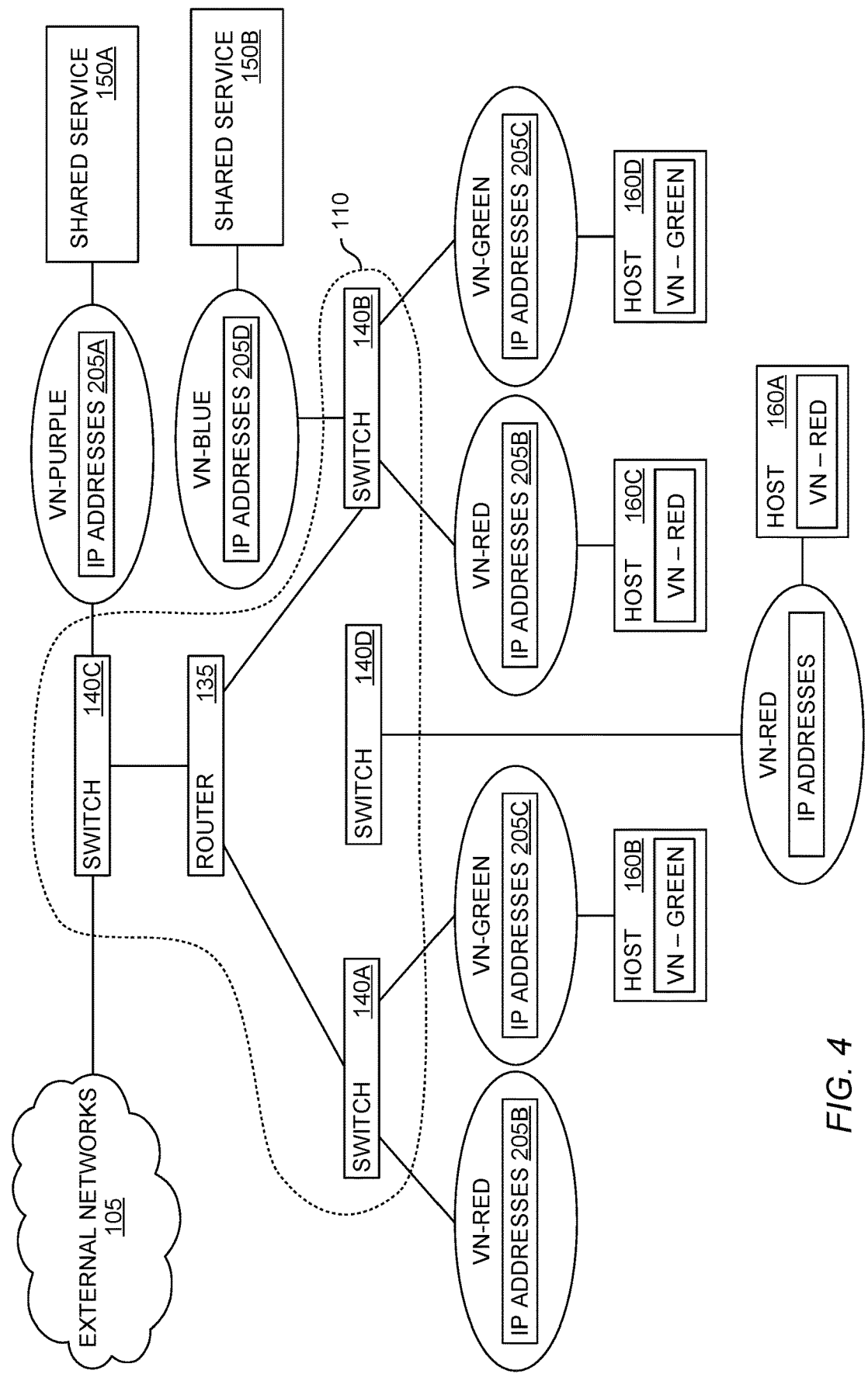
FIG. 4 illustrates a second state of the enterprise fabric following a host roam, according to an embodiment described herein.

FIG. 4 illustrates a second state of the enterprise fabric 110 following a host roam, according to an embodiment described herein. Specifically, FIG. 4 illustrates the host 160A roaming from the switch 140A to a switch 140D. For example, the host 160A may be a laptop which the user has moved to a different building within the enterprise fabric 110. As such, the laptop now uses the switch 140D to connect to the enterprise fabric 110 instead of the switch 140A.

When the host 160A connects to the switch 140D, the switch 140D informs the controller 115. Using, for example, a unique ID associated with the host 160A (e.g., a MAC address), the controller 115 may determine that the host 160A was previously connected to the enterprise fabric 110 and is assigned to the Red VN. As such, the host 160A may be assigned its same IP address or a new IP address within the IP addresses 205B in the Red VN. The switch 140D and the controller 115 may perform other steps associated with the roam which are not described herein.

The controller 115 updates the HTDB to indicate the new network endpoint associated with the host 160A—i.e., the switch 140D. However, this means the local routing information stored in the caches in the switches 140 may be stale. For example, the routing cache in the switch 140B may still indicate that the host 160A is coupled to the switch 140A. Thus, if the switch 140B forwards data to switch 140A, the switch 140A would respond to inform the switch 140B that the host 160A is no longer connected. The switch 140B could then query the controller 115 to determine the new location of the host 160A using the HTDB. However, waiting on the switches 140 to discover on their own that the routing caches are stale delays the time required before the fabric 110 reconverges.

Figures 5, 6:
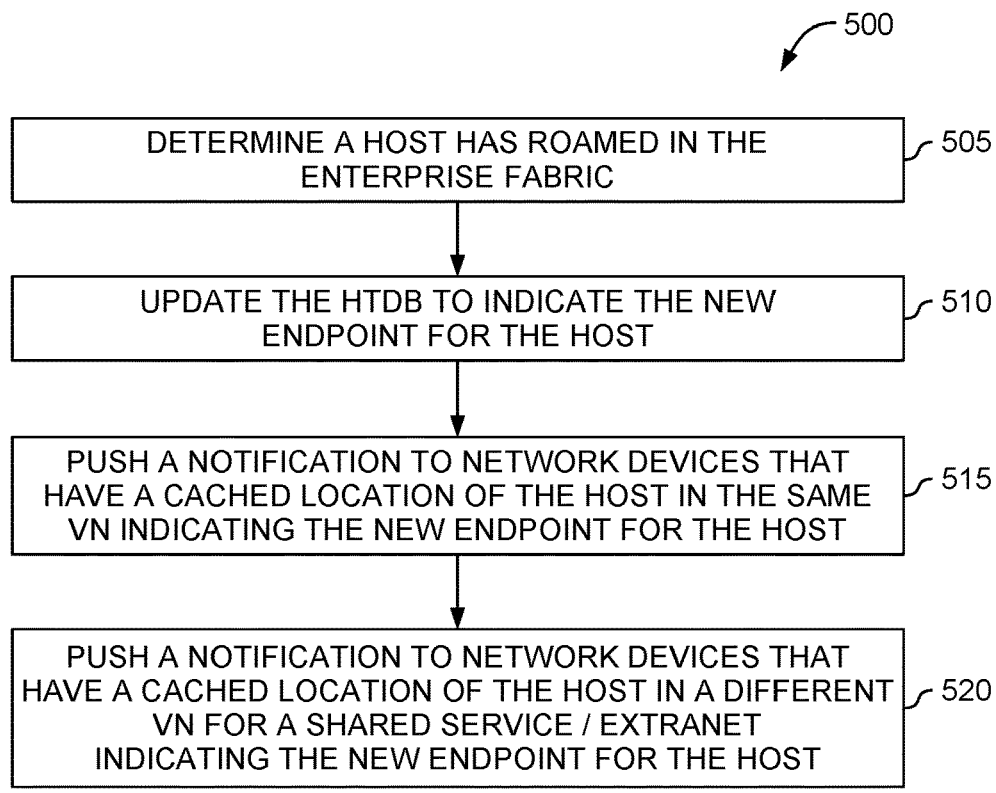
FIG. 5 is a flowchart for achieving fast roaming, according to an embodiment described herein.
FIG. 6 illustrates an updated host tracking database following a host roam, according to an embodiment described herein.

FIG. 5 is a flowchart of a method 500 for achieving fast roaming, according to an embodiment described herein. At block 505, the controller determines that a host has roamed in the enterprise fabric. For example, the controller may be notified by the edge nodes or devices when a new host associates with the devices. The controller may determine whether the host is a new host (e.g., was not previously connected to the enterprise fabric) or a roaming host. For example, the controller or the edge devices may maintain a list of hosts that are, or previously have, connected to the enterprise fabric. Using a unique ID corresponding to the host, the controller can determine if the host is new or is a previously connected host that has roamed to a new network endpoint.

Although the embodiments herein describe a host roaming, the method 500 can also be used if a shared service is moved. Referring to FIG. 4, a system administrator may disconnect the shared service 150A (e.g., a DHCP server) from the switch 140C and instead connect the shared service 150A to the switch 140B. The controller can use the method 500 to cause the enterprise fabric to reconverge on the new location of the shared service 150A.

At block 510, the controller updates the HTDB to indicate the new network endpoint for the host. That is, the controller updates the HTDB to indicate which edge node the roaming host is currently using to access the enterprise network.

FIG. 6 illustrates updating the HTDB 120, according to an embodiment described herein. As shown, the HTDB 120 is the same as the HTDB 120 shown in FIG. 3 except that the controller has updated the first row to indicate the host 160A is now connected to the network endpoint switch 140D rather than the switch 140A. Put differently, the controller updates the HTDB 120 to reflect that the host 160A has roamed to the switch 140D. Thus, anytime a network device queries the controller to determine the location of the host 160A, the HTDB 120 indicates the network endpoint corresponding to the host 160A is the switch 140D. In response, the requesting network device can establish a tunnel to the switch 140D in the enterprise fabric to transfer data to the host 160A.

Returning to FIG. 5, at block 515 the controller pushes a notification to network devices that have a cached location of the host in the same VN indicating the new network endpoint for the host. That is, instead of waiting for the network devices that have routing caches that point to the old location or endpoint for the host, the controller proactively transmits a notification to the network devices that their routing caches are stale and provides the network devices with the new network endpoint or location of the host. In one embodiment, the controller pushes out the notification in response to updating the HTDB in block 510.

In one embodiment, the controller pushes the notification to all the network devices that serve as network endpoints for hosts that are in the same VN as the roaming host. Using FIG. 4 as an example, the controller can push the notification that the host 160A is now coupled to the switch 140D to the switch 140B and any other edge nodes coupled to hosts in the Red VN even if those edge nodes have not previously communicated with the host 160A. Thus, the edge nodes can proactively update their routing caches without having to determine from the switch 140A that the host 160A has roamed. As such, pushing the notification avoids the messages and time needed for the switch 140B to send the data to the switch 140A, learn from switch 140A that the host 160A has roamed, send a message to the controller for the updated information for the host 160A, and receive updated routing information from the controller.

Alternatively, the controller pushes the notifications only to the network devices which have hosts in the same VN that have previously communicated with the roaming host. Continuing to use FIG. 4 as an example, the controller can use its saved history (e.g., the history 130 shown in FIG. 1) to determine that the switch 140B has queried the HTDB to determine the network endpoint for the host 160A so that the host 160C can transmit data to the host 160A. Because the host 160A and 160C are in the same VN, the controller permits the switch 140B to establish a tunnel to the switch 140A so that hosts 160A and 160C can share data. Moreover, the controller saves in its history that the switch 140B has established a tunnel to communicate with the host 160A. When the controller determines at block 505 that the host 160A has roamed to a different network endpoint, the controller can push the notification to the switch 140B. Thus, the switch 140B can update its routing cache without having to determine from switch 140A that host 160A has roamed to a different network endpoint. Moreover, in this example, the controller pushes the notifications to only the network devices that have established tunnels to communicate with the host 160A instead of sending the notification to all the network devices that have hosts 160 in the same VN as the roaming host. For example, if the switch 140B never transmitted data traffic to the host 160A (e.g., the switch 140B never established a tunnel to the switch 140A to permit the hosts 160A and 160C to share data), the controller does not push the notification to the switch 140B. This may reduce the number of notifications that are sent in the control plane which may help the overall latency of the enterprise fabric when compared to sending the notifications to all the network devices, some of which might not need the updated routing information.

At block 520, the controller pushes a notification to network devices that have a cached location of the host in a different VN used by a shared service (or extranet) indicating the new network endpoint for the host. As discussed above, the enterprise fabric can include shared VNs which permit hosts in different VNs to communicate with a shared service or extranet. Just like enabling two hosts in the same VN to share data, the edge nodes in the enterprise fabric can establish tunnels so that a host in one VN can communicate with a shared service in a different VN. The edge nodes coupled to the shared services also can maintain routing caches so that the shared service can communicate with hosts in different VNs.

Referring again to FIG. 4, when the host 160A roams to the switch 140D, the routing caches for the switches 140B and 140C which are connected to the shared services 150A and 150B may become stale or out-of-date. At block 520, the controller identifies the shared services that can (or have) communicated with the host 160A and pushes notifications to their corresponding network endpoints to update their routing caches. Like in block 515, the controller can (i) transmit the notifications to all the network devices connected to shared services that the roaming host is permitted to communicate with or (ii) transmit the notifications to only the network devices connected to the shared services which have previously communicated with the roaming host. This is described in more detail in FIG. 7.

Figures 7, 8:
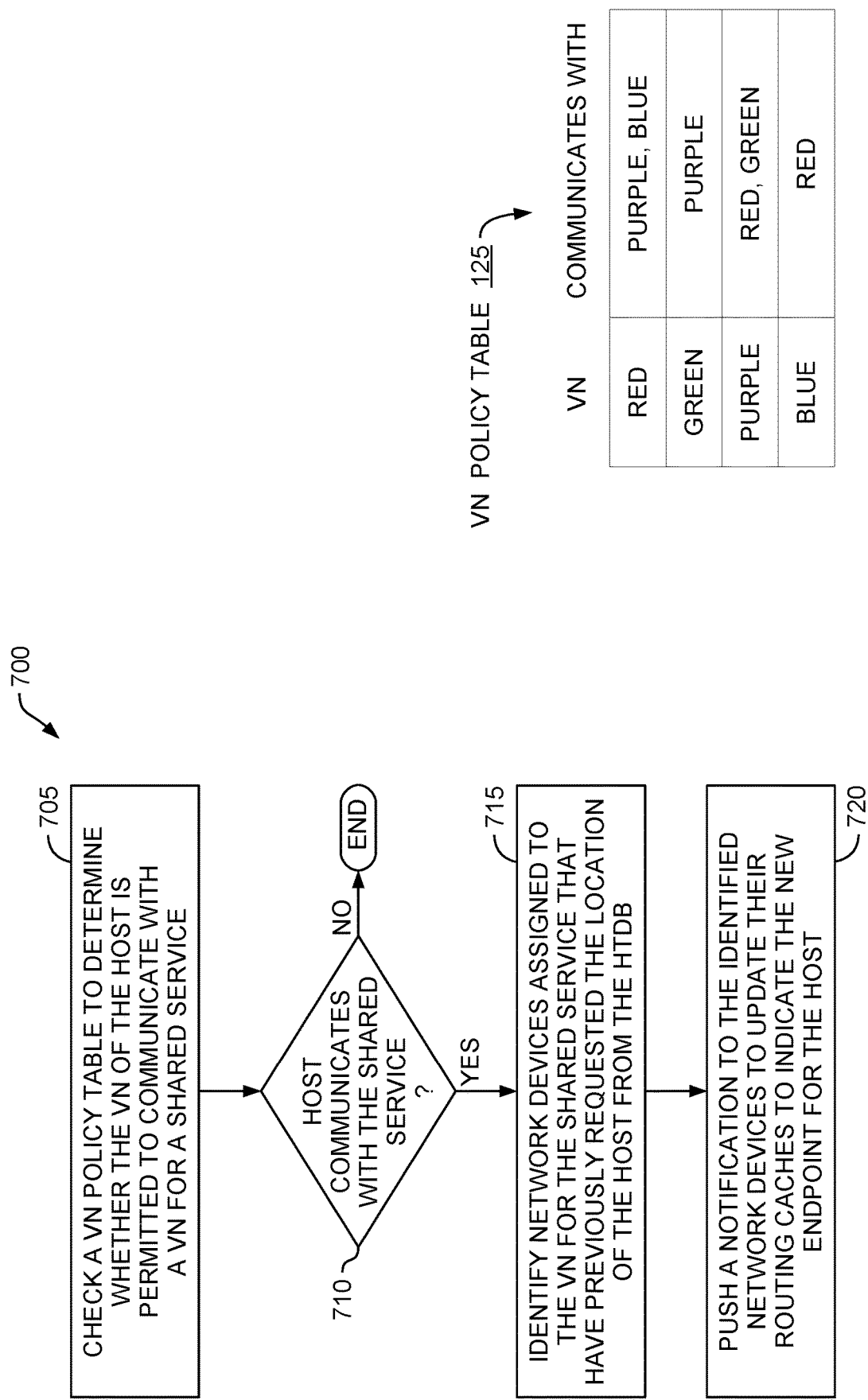
FIG. 7 is a flowchart for notifying a shared service when a host in a different virtual network roams, according to an embodiment described herein.
FIG. 8 illustrates a virtual network policy table, according to an embodiment described herein.

FIG. 7 is a flowchart of a method 700 for notifying a shared service when a host roams in a different VN, according to an embodiment described herein. In one embodiment, the method 700 begins after blocks 505 and 510 of the method 500 where the controller determines a host has roamed to a different network endpoint and that the HTDB should be updated. At block 705, the controller checks a VN policy table to determine whether the VN of the roaming host communicates with a VN for a shared service. As mentioned above, the VN policy table can include a list of the VNs in the enterprise fabric and the corresponding VNs each of the VNs can communicate with.

FIG. 8 illustrates the VN policy table 125, according to an embodiment described herein. As shown, the table 125 lists the VNs in the enterprise fabric 110 shown in FIG. 4 which includes the Red, Green, Purple, and Blue VNs. The Purple and Blue VNs are assigned to shared services while the Red and Green VNs are used by host devices. In this example, the second column of the VN policy table 125 indicates that the hosts in the Red VN can communicate with shared services in the Purple and the Blue VNs. The hosts in the Green VN, however, can only communicate with the shared services in the Purple VN. Furthermore, the Red and Green VNs cannot communicate with each other which is also true for the Purple and Blue VNs.

In one embodiment, a system administrator establishes and maintains the VN policy table 125. Moreover, the administrator may set policies for controlling how new hosts and shared services are assigned to the VNs. For example, certain types of hosts may be assigned to the Red VN while other types are assigned to the Green VN. For instance, user devices (e.g., mobile phones, laptops, tablets, etc.) are assigned to the Red VN while IoT devices (e.g., IoT lightbulbs, thermostats, etc.) are assigned to the Green VN. The controller can use these policies to assign new hosts to one of the VNs and then use the VN policy table 125 to control how the hosts and the shared services in the different VNs communicate.

When determining a host has roamed, the controller can reference the VN policy table 125 to determine if the VN for the roaming host is permitted to communicate with different VNs that are assigned shared services. That is, at block 710 the controller determines whether the roaming host is permitted to communicate with a different VN. Again referring to FIG. 4, after determining the host 160A has roamed, the controller can query the VN policy table 125 to determine which other VNs the host 160A can communicate with. Because the host 160A is in the Red VN, the host 160A can communicate with the Purple and Blue VNs. As such, the controller determines at block 710 that the host 160A is permitted to communicate with shared services in both the Purple and Blue VNs. In another embodiment, the shared services can be described as publishers while the hosts are subscribers. The VN policy table 125 can indicate which shared service VNs (i.e., publishers) can communicate with which host VNs (i.e., subscribers). A host can communicate with a shared service only if it belongs to a VN which is subscribed to the VN.

At block 710 the controller determines whether the roaming host is permitted to communicate with a different VN. That is, the controller can reference the VN policy table and identify other VNs that the roaming host has permission to communicate with (or which VNs the host VN is subscribed to). If the host belongs to a VN that is not permitted to communicate with a different VN (e.g., a VN for a shared service), then the method 700 ends.

Assuming the host can communicate with a different VN, the method 700 proceeds to block 715 where the controller identifies network devices assigned to the VN (or VNs) for the shared service(s) that have previously requested the location of the host from the HTDB. In one embodiment, the controller evaluates its history to determine if the roaming host has previously communicated with a shared service. To do so, the controller may determine if a network endpoint for the shared service has previously transmitted a request to the controller to identify the old network endpoint corresponding to the roaming host. Additionally, the controller can determine if the old network endpoint for the host has previously transmitted a request to the controller to identify the network endpoint corresponding to the shared service. In either case, the controller knows that a tunnel was established so that the shared service and the host can communicate. The controller can evaluate each of the shared services to determine if those shared services previously communicated with the roaming host, thereby indicating which network devices in the enterprise fabric (e.g., which network endpoints or edge nodes) may contain stale routing information in their caches.

However, if the host has not previously communicated with any shared service (even if it was permitted to), then the method 700 may end without the controller pushing a notification to the network endpoints for the shared services. That is, because none of the network endpoints cached routing information for reaching the old network endpoint for the host, there is no stale routing information that needs to be updated.

However, assuming that at block 715 the controller identifies at least one shared service that was previously communicating with the roaming host, at block 720 the controller pushes a notification to the identified network devices to update their routing caches to indicate the new network endpoint for the host. That is, the controller can update the network endpoints for the shared services (which are in a different VN than the roaming host) in a similar manner as the network endpoints for the hosts that are in the same VN as the roaming host. Thus, the network endpoints can proactively update their routing caches without waiting until data is sent to the old network endpoint and discovering that the host has roamed. The network endpoints would then query the controller to determine the new network endpoint for the host and establish a new tunnel to communicate with the host. Thus, the method 700 extends the advantages of proactively transmitting notifications to network endpoints that are in the same VN as the roaming host by proactively transmitting notification to network endpoints that are used by shared services that are in different VNs.

Although the method 700 describes transmitting the notifications to the network devices for the shared services that previously established a tunnel to the roaming host, in another embodiment, the controller may transmit the notifications to all the network devices coupled to the shared services. For example, referring to FIG. 4, if the roaming host 160A previously communicated with the shared service 150A in the Purple VN, but not the shared service 150A in the Blue VN, using method 700, the controller may transmit a notification to the switch 140C but not to the switch 140B. Alternatively, the controller may push notifications to all the network endpoints that are used by the shared services, without first checking if those network endpoints have established a tunnel to the old network endpoint of the roaming host. In that case, the controller pushes notifications to both the switches 140B and 140C even though the host 160A has never communicated with the shared service 150B. The switches 140B and 140C can update their routing caches accordingly.

Although the embodiments herein describe pushing the notifications to network endpoints used by shared services, this disclosure is not so limited and can apply to proactively pushing notification to network endpoints used by devices on any different VN (so long as the relationships established in the VN policy table is not violated). That is, although the VN policy table 125 indicates the hosts in the Red and Green VNs cannot communicate, in some instances, the hosts in one VN may be permitted to communicate with the hosts in a different VN (even if those hosts are not shared services or extranets)—e.g., the hosts in the Red VN can communicate with the hosts in the Green VN. In that case, the controller can use the method 700 to identify which hosts in a different VN have previously communicated with the roaming host and push notifications to their corresponding network endpoints to update their stale routing caches.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computing system, comprising: a processor; and
a memory storing a program configured to, when executed by the processor, to perform an operation, the operation comprising:
determining that a host has roamed to a new endpoint in a network fabric, wherein the host is assigned to a first virtual network in the network fabric;
determining, using a virtual network policy table, that the host is permitted to communicate with a shared service, wherein the shared service is assigned to a second virtual network in the network fabric;
identifying a first endpoint in the network fabric connected to the shared service; and
pushing, in response to determining that the host has roamed, a notification to the first endpoint in the network fabric connected to the shared service, wherein the notification instructs the first endpoint to update a local routing cache to point to the new endpoint for a location of the host;
and wherein the virtual network policy table lists a plurality of virtual networks established in the network fabric and which other virtual network each of the plurality of virtual networks is permitted to communicate with, wherein at least one virtual network of the plurality of virtual networks is not permitted to communicate with another virtual network of the plurality of virtual networks in the network fabric.

2. The computing system of claim 1, wherein the operation further comprises:
updating a host tracking database (HTDB) indicating the new endpoint for the host in response to determining that the host has roamed.

3. The computing system of claim 2, wherein the operation further comprises:
identifying other network devices in the network fabric that have previously requested a location of the host from the HTDB, wherein the other network devices are connected to shared services that are assigned to at least one virtual network different than the first virtual network; and
pushing the notification to the other network devices to update local routing caches, wherein the other network devices includes the first endpoint.

4. The computing system of claim 2, wherein the operation further comprises:
identifying other network devices in the network fabric that have previously requested a location of the host from the HTDB, wherein the other network devices are connected to other hosts that are assigned to the first virtual network; and
pushing the notification to the other network devices to update local routing caches.

5. The computing system of claim 2, wherein the operation further comprises:
pushing the notification to all network devices associated with the second virtual network regardless whether the network devices have previously requested a location of the host from the HTDB.

6. The computing system of claim 1, wherein the shared service comprises at least one of a Dynamic Host Configuration Protocol (DHCP) server and Domain Name Server (DNS) connected to the first endpoint.

7. A method comprising:
determining that a host has roamed to a new endpoint in a network fabric, wherein the host is assigned to a first virtual network in the network fabric;
determining, using a virtual network policy table, that the host is permitted to communicate with a shared service, wherein the shared service is assigned to a second virtual network in the network fabric;
identifying a first endpoint in the network fabric connected to the shared service; and
pushing, in response to determining that the host has roamed, a notification to a first endpoint in the network fabric connected to the shared service, wherein the notification instructs the first endpoint to update a local routing cache to point to the new endpoint for a location of the host;
and wherein the virtual network policy table lists a plurality of virtual networks established in the network fabric and which other virtual network each of the plurality of virtual networks is permitted to communicate with, wherein at least one virtual network of the plurality of virtual networks is not permitted to communicate with another virtual network of the plurality of virtual networks in the network fabric.

8. The method of claim 7, further comprising:
updating a HTDB indicating the new endpoint for the host in response to determining that the host has roamed.

9. The method of claim 8, further comprising:
identifying other network devices in the network fabric that have previously requested a location of the host from the HTDB, wherein the other network devices are connected to shared services that are assigned to at least one virtual network different than the first virtual network; and
pushing the notification to the other network devices to update local routing caches, wherein the other network devices includes the first endpoint.

10. The method of claim 8, further comprising:
identifying other network devices in the network fabric that have previously requested a location of the host from the HTDB, wherein the other network devices are connected to other hosts that are assigned to the first virtual network; and
pushing the notification to the other network devices to update local routing caches.

11. The method of claim 8, further comprising:
pushing the notification to all network devices associated with the second virtual network regardless whether the network devices have previously requested a location of the host from the HTDB.

12. The method of claim 7, wherein the shared service comprises at least one of a DHCP server and DNS connected to the first endpoint.

13. A network fabric, comprising:
a new endpoint connected to a host, wherein the host is assigned to a first virtual network in the network fabric;
a first endpoint connected to a shared service, wherein the shared service is assigned to a second virtual network in the network fabric; and a controller configured to:
determine that the host has roamed to the new endpoint; determine, using a virtual network policy table, that the host is permitted to communicate with the shared service;
identifying a first endpoint in the network fabric connected to the shared service; and
push, in response to determining that the host has roamed, a notification to the first endpoint, wherein the notification instructs the first endpoint to update a local routing cache to point to the new endpoint for a location of the host;
and wherein the virtual network policy table lists a plurality of virtual networks established in the network fabric and which other virtual network each of the plurality of virtual networks is permitted to communicate with, wherein at least one virtual network of the plurality of virtual networks is not permitted to communicate with another virtual network of the plurality of virtual networks in the network fabric.

14. The network fabric of claim 13, wherein the controller is configured to:
update a HTDB indicating the new endpoint for the host in response to determining that the host has roamed.

15. The network fabric of claim 14, wherein the controller is configured to:
identifying other network devices in the network fabric that have previously requested a location of the host from the HTDB, wherein the other network devices are connected to shared services that are assigned to at least one virtual network different than the first virtual network; and pushing the notification to the other network devices to update local routing caches, wherein the other network devices includes the first endpoint.

16. The network fabric of claim 14, wherein the controller is configured to:
identifying other network devices in the network fabric that have previously requested a location of the host from the HTDB, wherein the other network devices are connected to other hosts that are assigned to the first virtual network; and
pushing the notification to the other network devices to update local routing caches.

17. The network fabric of claim 14, wherein the controller is configured to:
pushing the notification to all network devices associated with the second virtual network regardless whether the network devices have previously requested a location of the host from the HTDB.

* * * * *